Aug. 18, 1936.   G. M. BELLANCA   2,051,021
RETRACTABLE LANDING GEAR
Filed Nov. 2, 1933   2 Sheets-Sheet 2
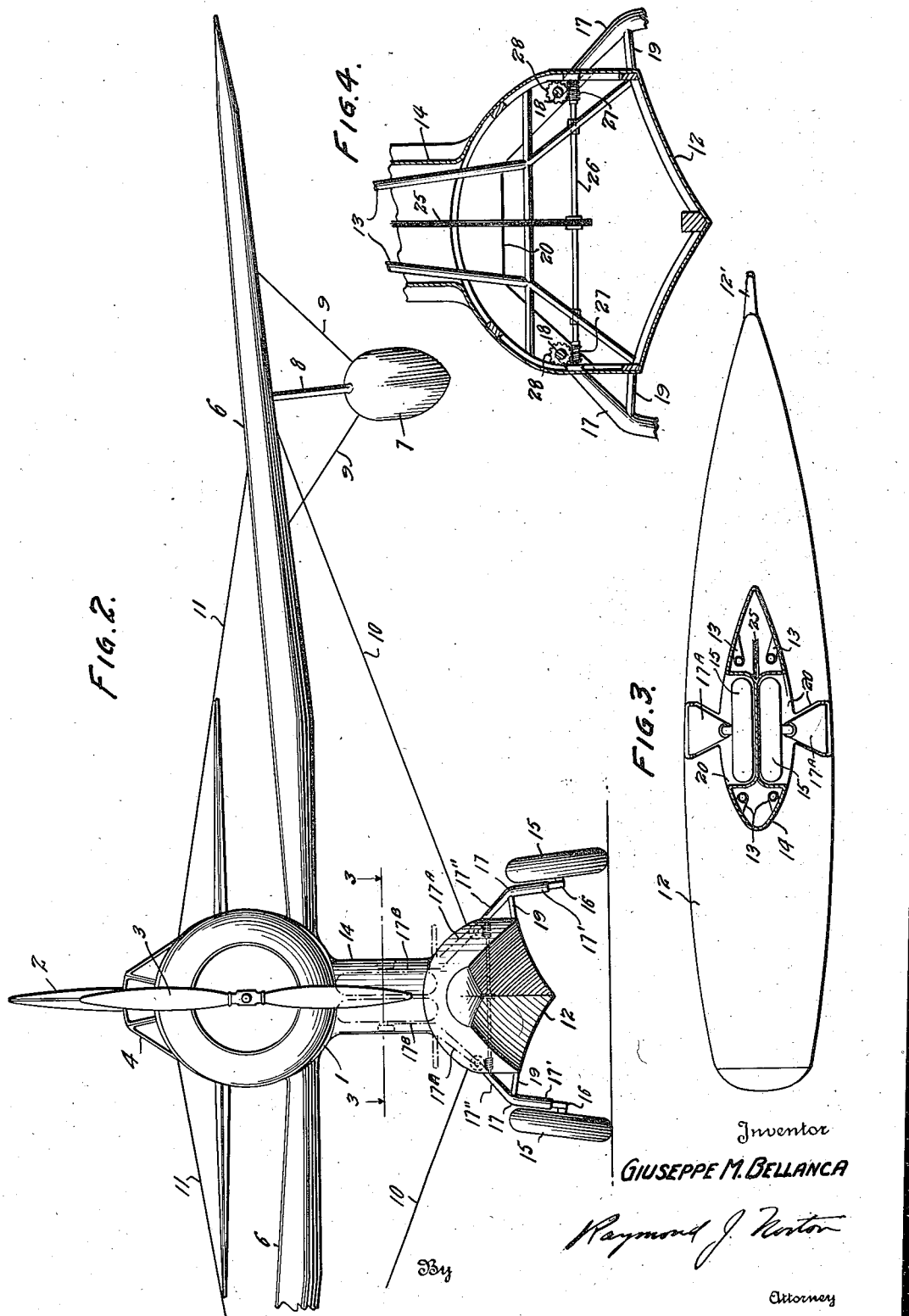
Inventor
GIUSEPPE M. BELLANCA Patented Aug. 18, 1936

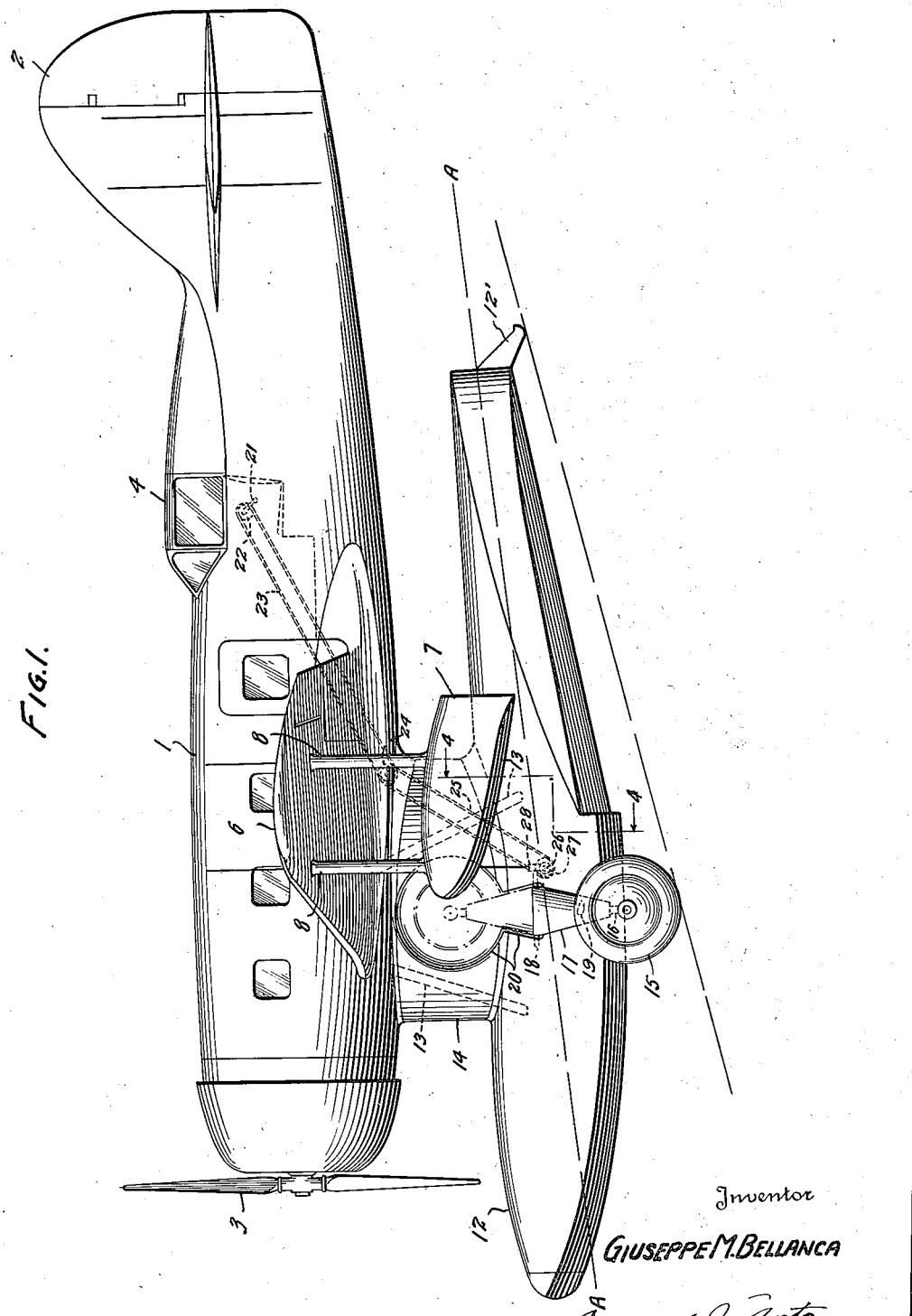

2,051,021

UNITED STATES PATENT OFFICE 2,051,021

RETRACTABLE LANDING GEAR

Giuseppe M. Bellanca, New Castle, Del.

Application November 2, 1933, Serial No. 696,432

1 Claim. (Cl. 244—2)

This invention relates to improvements in airplane landing gear and more particularly to an improved retractable landing gear.

Many types of retractable landing gear have been proposed heretofore. These each present disadvantages. Such mechanisms are not always positive in operation; in addition to this, prior installations have added considerably to the parasitic resistance, due to the difficulty of properly stream lining the assemblage when in the retracted position. These disadvantages have been accentuated in the amphibian type of plane. In the latter, in the past, it was the usual practice to retract the ground wheels to a position within the contour of the float or pontoon structure. Such a method necessarily involved a rather drastic modification of the structure of the float. This was invariably accompanied by an increase in the parasitic resistance.

An object of the present invention is to provide a novel type of retractable landing gear.

Another object is to provide an improved amphibian plane.

A further object is to provide an improved type of landing gear characterized by a low parasitic resistance when in the retracted position.

A still further object is to provide an improved type of float strut mounting.

With these and other equally important objects in view, the invention comprehends the concept of providing a rectractable wheel assemblage for amphibians, the installation of which does not require a modification of the contour of the float structure. The invention also includes the provision of an improved strut arrangement specifically correlated with respect to the landing gear to insure minimum resistance.

In order to clearly explain the underlying principles to those skilled in the art, a typical physical embodiment is illustrated in the accompanying drawings in which:

Figure 1 is a side elevation of the improved airplane.

Fig. 2 is a front view of the device shown in Figure 1.

Fig. 3 is a top section taken along line 3—3 of Figure 2; and

Fig. 4 is an enlarged detail of a section of the float, on line 4—4 of Figure 1.

As shown in the drawings, the invention may be embodied in an airplane having a fuselage 1, of any desired type, which fuselage includes an empennage structure designated generally by the numeral 2. The plane is provided with a suitable power plant driving the tractor propeller 3. Suitably positioned within the fuselage is a pilot's cockpit 4.

While the plane may be of any desired type, the one chosen for illustration is of the low wing monoplane type, having the wing sections 6 suitably secured to a lower portion of the fuselage. Such wings are provided with wing tip pontoons suitably secured to the wing as by the struts 8 and guy wires 9. The wings 6 may be suitably braced as by the flying wires 10 and the landing wires 11. Additional tension bracing means such as incidence wires may be employed.

In the preferred embodiment, the plane is of the amphibian type. Associated with the fuselage is the float structure 12. This may be of any approved design with a rear step portion. If desired, the pontoon may be provided with the tail skid 12'.

In accordance with the major principle of the present invention, the float is secured to the fuselage by securing means, which though rigid and adequate, yet is characterized by a relatively low parasitic resistance. Considered more specifically, the mounting for the float comprises a plurality of float struts 13 attached at one end to the float and at the other to the under side of the fuselage. As shown in Figure 3, the entire float mounting, that is to say, the struts 13 are enclosed with the stream line fairing 14. At the upper and lower portions, the fairing is faired into the fuselage and float respectively.

The fairing 14 serves not only to house the float struts in the one enclosure and thus diminish parasitic resistance, but it also serves as a housing member for the landing wheels, in a manner more fully to be described.

The ground landing mechanism of the plane comprises the ground wheels 15 with the axle of which is associated the oleo gear 16. The oleo gear is associated with the frame 17, which as shown in Figures 1 and 3, may comprise the angularly disposed sections 17' and 17''. Such sections may be detachable or made in one integral piece and are pivoted upon the pivots 18 positioned within the interior of the float. As shown in Figure 1, the utilization of the tapering or triangular frame mounting structure, provides for a relatively wide or elongated bearing upon the pivoted member 18. The retractable landing mechanism also includes the beam member 19 which extends laterally from the landing gear frame 17 and is adapted to cooperate with locking means (not shown) suitably positioned on the float for the purpose of locking the landing gear in the fully extended position. Any suitable type of locking means may be employed for this purpose, such for example, as is described in my copending application, Serial No. 671,564, filed May 17, 1933.

It is to be observed that in retracting the landing wheel mechanism, the whole unit 15—16—17—18—19 is pivoted outwardly and upwardly upon the single pivot 18. In other words, retraction of the landing gear involves a single pivotal movement and a plurality of differential movements or parallel linkages is avoided. It will likewise be appreciated, from an inspection of Figure 2, that the upper arm or portion of the frame 17 is deflected inwardly towards the point of pivotal connection 18. This form of structure insures two advantages. In the first place, it provides for a relatively wide space between the landing wheels when they are in the extended position and thus insures optimum stability of the plane when taxiing on the ground. When the landing wheels are retracted by a swing movement about the pivot 18, the upper portion of the frame 17 falls within the contour of the float at the position 17a (Figure 2). The vertical section of the landing wheel frame occupies the vertical position 17b. In the retracted position, therefore, the wheel 15 and the associated vertical section of the landing wheel frame occupies a position within the fairing 14.

It will be appreciated that the provision of the fairing 14 is peculiarly advantageous. Not only does it serve to fair the float struts 13, but it also serves as a housing member for the landing wheel 15, when the latter is in the retracted position. Thus, the necessary conformation of a housing for the landing wheel is made not upon a float structure, but a relatively simple and inexpensive strut fairing. The advantages of this in respect of installation cost and upkeep will immediately be appreciated. The only modifications of the typical float structure necessitated by the present invention, is the provision of a small indentation 20 (Figure 3) of a shape and depth only sufficient to house the framing member 17'. In view of the construction and movement of the frame member 17, it will be appreciated that such a change in the skin of the float structure can readily be made without any sacrifice of desirable structurable float features.

The landing gear mechanism may be extended and retracted by any desired type of transmission mechanism. There is shown on the drawings, a typical mechanism for accomplishing this function, but this is given merely as illustrative of any mechanism which will subserve the desired function. This mechanism may comprise a crank or other suitable operating member 21 positioned at an available point within the cockpit. Motion from the crank 21 may be transmitted to the landing gear through the sprocket 22, flexible drive 23, sprocket 24 and thence through the flexible drive 25 to the cross shaft 26. The cross shaft is securely mounted in suitable bearings within the interior of the float and is provided on each end of the worm 27. Meshing with the worm wheel 27 and keyed upon the shaft 18, is the worm wheel 28. It will be understood that rotation of the crank 21 will cause a corresponding rotation of the worm wheel 28 through the intermediacy of the transmission mechanism and will thus raise or lower the landing wheel structure. It will be understood that as the landing gear is lowered to its fully extended position, the inner portion of the arm 19 engages a latch mechanism upon the float, which latter may be locked through the operation of any suitable locking means controlled from the cockpit. When it is desired to retract the mechanism, the latch associated with the member 19 may be unlocked, after which operation, the crank 21 will raise the landing mechanism to the position shown in Figure 2. Of course, it will be appreciated that the latch associated with the arm 19 may be unlocked by a preliminary movement of the cross shaft 26 and for this purpose, any type of lost motion mechanism may be provided.

As will be seen from an inspection of Figure 1, the load water line A—A extends below the position occupied by the pivots 18. Hence in embodying the present invention in any float, no modification of the water surface of the float is necessary. Furthermore, due to the fact that the bulky portions of the landing gear are housed within the fairing 14, and only a minor portion, i. e., the frame 17a, is housed within the float, but very slight modification of the float structure is necessitated. It is also to be observed that when the plane is in the air, the fairing 14 serves the double function of fairing the struts 13 and the bulky landing gear mechanism. The advantage of housing the wheels 15 within the fairing 14 rather than the float, on the one hand, or the main wings of the plane on the other, will immediately recommend itself to those skilled in the art.

It will be appreciated that the fairing 14 may be made of any suitable material of construction. Thus the fairing may be constructed of rather thin plywood so as to serve only as a stream-line casing. If desired, however, stronger materials may be employed, such for example as light weight high strength alloys, in which case the fairing may be utilized to serve as a structural element. In these circumstances the casing 14 then becomes a type of cabane strut, serving to transmit stresses between the float and the fuselage.

It will be appreciated that a very important advantageous result of the present invention is the possibility of utilizing a retractable landing gear mechanism upon a seaplane, without in any way modifying the wing structure and with but a slight and simple modification of the skin or hollow of the float.

While a preferred modification of the invention has been shown and described, it will be understood that this is given merely to exemplify the underlying principles of the present invention. The claims are, therefore, not to be considered limited to the particular embodiment selected for illustration except if such limitations are clearly embodied by the appending claims.

What is claimed is:

In an amphibian plane having a fuselage, a float spaced below the fuselage, retractable landing wheels pivotally mounted within the contour of the float; a plurality of struts interconnecting the fuselage and the float, a streamlined casing completely enclosing the struts and being of approximately one-half the width of the float and of a height at least equal to the diameter of the landing wheel, the casing being formed with recesses for the reception of the landing wheel when the latter is in retracted position, the skin of the float being formed with recesses for the reception of the landing wheel struts when the landing wheel is in retracted position, and means to pivot the landing wheel to move it from the extended operative position to the retracted position.

GIUSEPPE M. BELLANCA.